United States Patent
Tompkins

[15] 3,683,187
[45] Aug. 8, 1972

[54] METHODS AND APPARATUS FOR INSPECTING TUBULAR GOODS USING A CONTINUOUS SIGNAL CALIBRATING SYSTEM

[72] Inventor: David R. Tompkins, Houston, Tex.

[73] Assignee: Schlumberger Technology Corporation, New York, N.Y.

[22] Filed: March 26, 1970

[21] Appl. No.: 22,935

[52] U.S. Cl. ............250/83.3 D, 250/52, 250/83 C, 250/105, 250/106 S
[51] Int. Cl. ..........................G01t 1/17, G01n 23/08
[58] Field of Search ....250/83 C, 83.3 D, 106 S, 105, 250/52

[56] References Cited

UNITED STATES PATENTS

| | | | |
|---|---|---|---|
| 2,829,268 | 4/1958 | Chope | 250/83 C UX |
| 2,549,402 | 4/1951 | Vossberg, Jr. | 250/83 C UX |
| 2,964,630 | 12/1960 | Bosch | 250/83.3 D X |

Primary Examiner—Walter Stolwein
Assistant Examiner—Morton J. Frome
Attorney—Ernest R. Archambeau, Jr., Donald H. Fidler, David L. Moseley, Edward M. Roney, William R. Sherman and John P. Sinnott

[57] ABSTRACT

In the new and improved radiation apparatus disclosed herein for inspecting tubular goods, a radiation detector is coaxially positioned within a tubular member being axially translated along a selected inspection axis for receiving radiation from a radiation emitter facing the detector and rotating around the exterior of the tubular member. In the preferred embodiment disclosed herein, a unique radiation-attenuating device or shutter is cooperatively arranged to be normally interposed between the radiation emitter and the radiation detector to at least reduce the intensity of radiation imposed on the detector when a tubular member is not being inspected. The shutter is moved by selectively-operated controls to a second position as a tubular member that is to be inspected is placed between the radiation emitter and detector. In practicing the methods of the present invention with the disclosed apparatus, the shutter is uniquely arranged to cooperate with the detector circuitry for developing a comparison signal when the shutter is interposed between the radiation emitter and detector. The accuracy of this comparison signal is further assured by providing one or more clamping devices which are uniquely arranged for securing the radiation detector in a selected position when the comparison signal is developed.

14 Claims, 9 Drawing Figures

PATENTED AUG 8 1972

David R. Tompkins
INVENTOR

BY *E.L.Archambeau Jr.*
ATTORNEY

David R. Tompkins
INVENTOR

David R. Tompkins
INVENTOR

BY
ATTORNEY

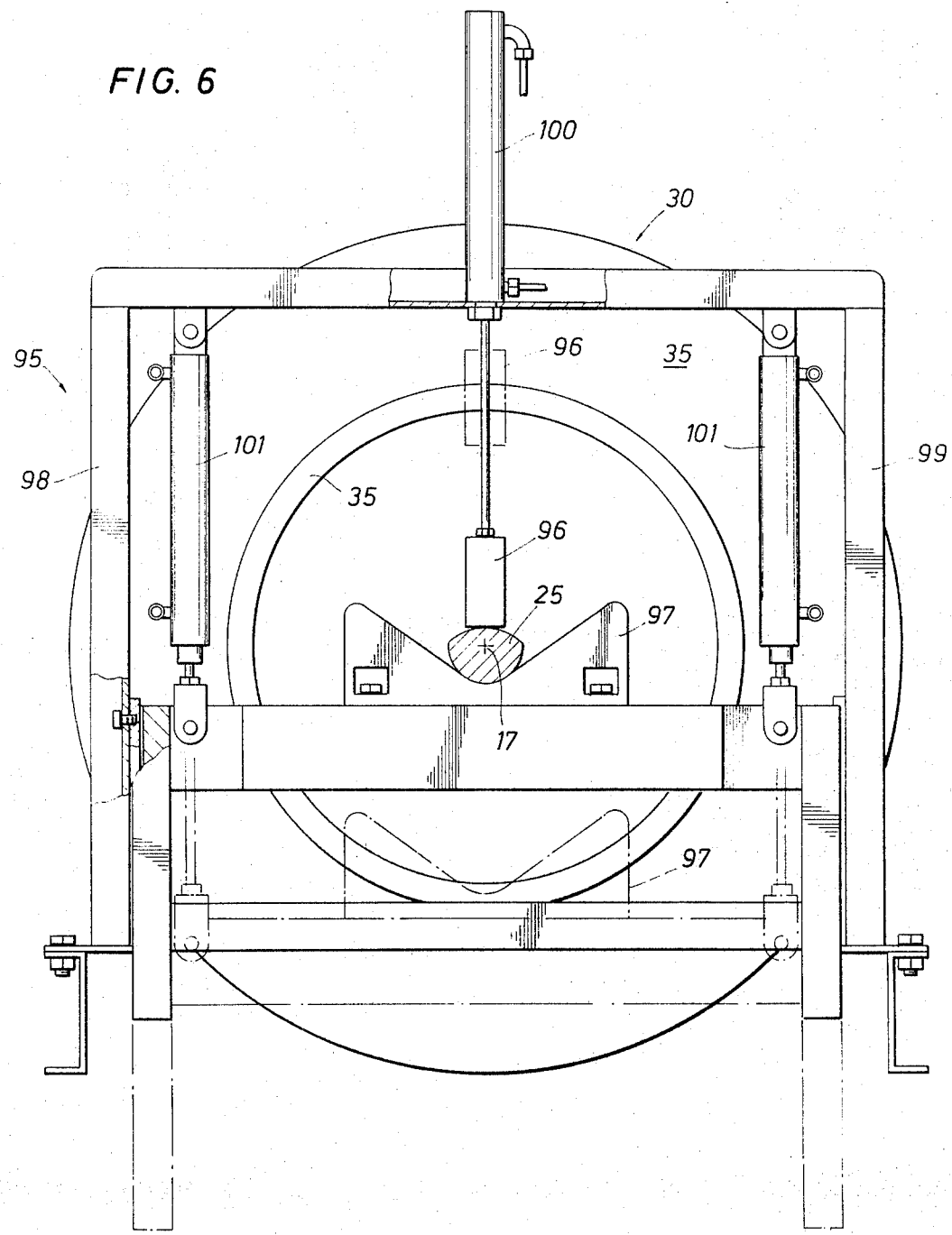

METHODS AND APPARATUS FOR INSPECTING TUBULAR GOODS USING A CONTINUOUS SIGNAL CALIBRATING SYSTEM

Elongated tubular goods, such as oil-field piping or tubing and the like, are frequently inspected for hidden flaws and other latent defects that might cause failure of such tubular members while in service. As one aspect of such inspections, it is often desired to also obtain representative measurements of wall thickness of such tubular members at spaced points along their length. It will be recognized, of course, that such thickness measurements must be obtained at several points around the circumference of a pipe as well as along its entire length to be certain of reliably detecting imperfections.

Various thickness-measuring devices have, of course, been devised heretofore for inspecting long lengths of pipe and tubing. For instance, one typical device of this nature employs a rigidly-interconnected radiation detector and radioactive source that are simultaneously rotated around an axially-moving pipe, with the resulting variations in measured radiation intensity being used to derive corresponding wall-thickness measurements along a generally-helical path around the tubular member. Although the ideal situation would be to move the pipe being inspected slowly and rotate the radiation devices at high speeds, practical considerations necessarily restrict these units to low rotative speeds which correspondingly further limit the axial speed of the pipe joints and, therefore, result in inefficient inspection rates.

Alternatively, the new and improved inspection device disclosed in a copending patent application (Ser. No. 744,861) by the present inventor has been found to provide accurate thickness measurements of various tubular goods at efficient inspection rates. As described in that application, a radiation detector is mounted on the free end of a fixed, but relatively flexible, elongated lance that is aligned along a selected inspection axis and adapted to receive a tubular member being moved axially along the axis. A radiation source is suitably mounted within an annular rotatable member adapted for rotation at high speeds around the exterior of a tubular member moving along the inspection axis. By means of a unique arrangement of converging focusing slots, a sharply-defined radiation pattern substantially smaller in area than the active portion of the radiation detector is imposed thereon. In this manner, limited lateral or vertical movements of the radiation detector confined within the moving tubular member being inspected will produce only a negligible effect on the measurements provided by the radiation detector.

Although this new and improved inspection apparatus has proven to be successful in certain situations, it has been found that where typical oil-field tubular goods are being inspected, the efficiency of this apparatus is significantly improved where the radiation means used therewith produce a substantial count rate at the detector in the order of $10^6$ to $20^6$ counts per second as a tubular member is being inspected. With count rates of this magnitude, it will be appreciated that the detector will be operated at optimum statistical accuracy so that pipes can be moved through the inspection apparatus at reasonably-high axial speeds without unduly compromising the accuracy of the resulting thickness measurements.

To produce such high count rates while there is an intervening pipe wall between the radiation means and detector will, of course, cause the detector to be subjected to much-greater count rates when a pipe is not positioned over the detector. It has been found, however, that with even the highest-quality radioactivity detectors, the prolonged exposure of the detector to such greatly-increased count rates will rapidly cause the detector to begin drifting and that this drift or error is accelerated at an exponentially-increasing rate so long as the exposure is continued. Moreover, it has been found that even brief direct exposures of even a high-quality radioactivity detector to such greatly-increased count rates will quickly initiate unreliable or unstable operation of the detector which will not be corrected until the detector has been inserted into a pipe for a considerable period of time. Such unpredictable operation of the detector will, of course, either result in unreliable measurements being obtained or make it necessary to delay the inspection of another pipe until the detector has again stabilized.

Accordingly, it is an object of the present invention to provide new and improved methods and apparatus for accurately measuring the wall thicknesses of elongated tubular members such as oil-field tubular goods.

It is a further object of the invention to provide new and improved radiation apparatus for inspecting axially-moving tubular members in which the operation of the radiation detector employed therewith is selectively stabilized for providing more-accurate measurements.

It is still another object of the present invention to provide new and improved methods and apparatus for calibrating the radiation detector employed with a radiation inspection system to obtain more-accurate measurements.

These and other objects of the present invention are attained by arranging radiation-emitting means to be rotated around a tubular member moving axially along a selected axis for laterally directing radiation through at least one wall of such a member and toward radiation-detecting means spatially disposed from the radiation-emitting means and operatively associated therewith. Selectively-operable radiation-controlling means are movably positioned between the radiation-emitting means and the radiation-detecting means and arranged for permitting the radiation-detecting means to be subjected to the full intensity of the radiation-emitting means only when a tubular member is interposed between the radiation means. Upon removal of a tubular member from the inspection apparatus, the radiation-controlling means are moved to another position for reducing the intensity of radiation imposed on the radiation-detecting means to a selected level. By arranging the radiation-controlling means to reduce the radiation intensity for producing a signal of known magnitude from the detecting means when a tubular member is removed from the apparatus, the radiation-detecting means can be accurately calibrated. In practicing the methods of the present invention, these objects are attained by obtaining a first signal representative of a known thickness, obtaining one or more second signals representative of unknown thicknesses and then comparing the first and second signals to determine these unknown thicknesses.

The novel features of the present invention are set forth with particularity in the appended claims. The invention, together with further objects and advantages thereof, may be best understood by way of the following description of exemplary methods and apparatus employing the principles of the invention as illustrated in the accompanying drawings, in which:

FIG. 1 schematically illustrates thickness-measuring apparatus employing the radiation-controlling means of the present invention as it may be arranged for cooperation with typical flaw-inspection apparatus;

Figure 2:
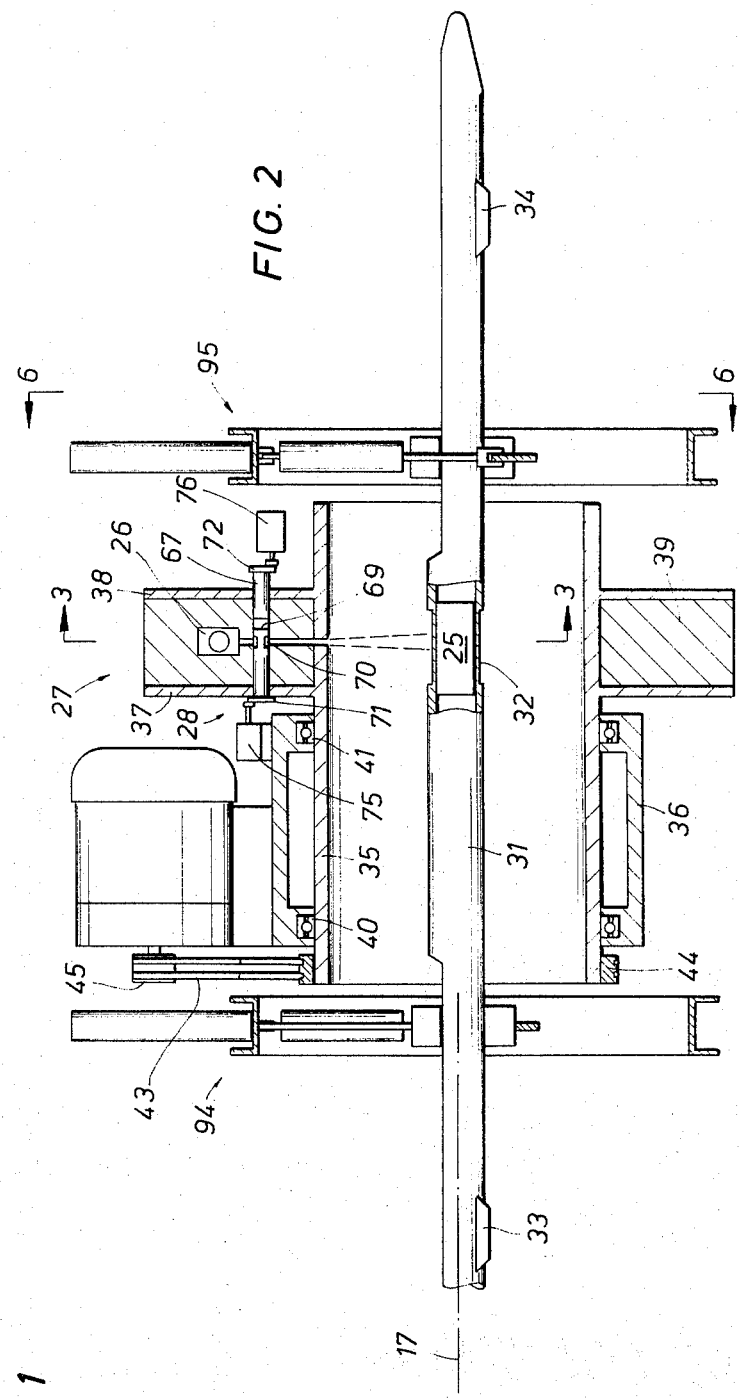
FIG. 2 is an elevational view, partially in cross-section, of a preferred arrangement of the thickness-measuring apparatus depicted in FIG. 1.
Figure 4:
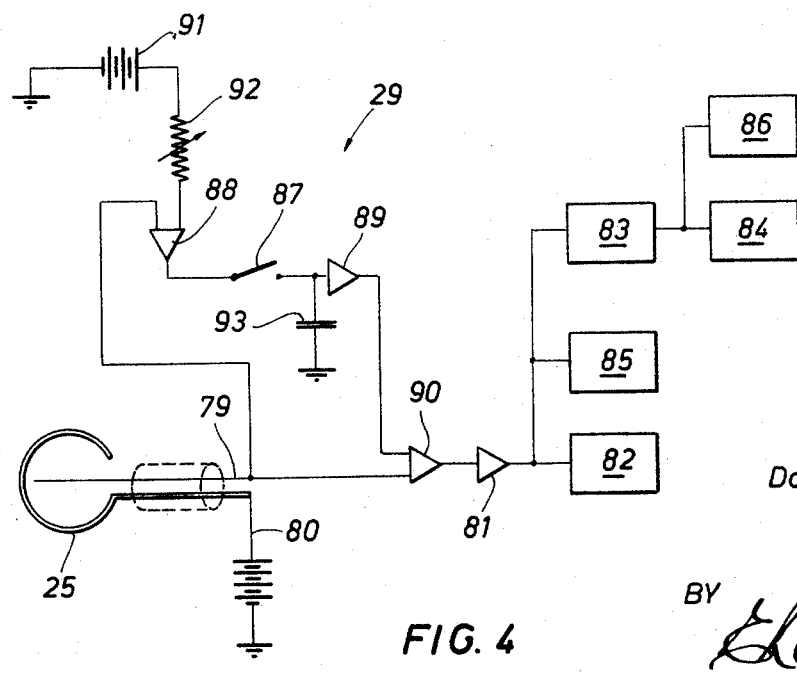
FIG. 4 is a schematic block diagram of a preferred embodiment of the new and improved calibrating circuitry of the present invention.

FIGS. 5A–5D respectively depict the successive operations of the circuitry shown in FIG. 4 during the performance of the new and improved methods of the present invention; and FIG. 6 is a cross-sectional view taken along the lines "6-6" in FIG. 2 showing a preferred embodiment of the new and improved detector-positioning means of the present invention.

Figure 1:
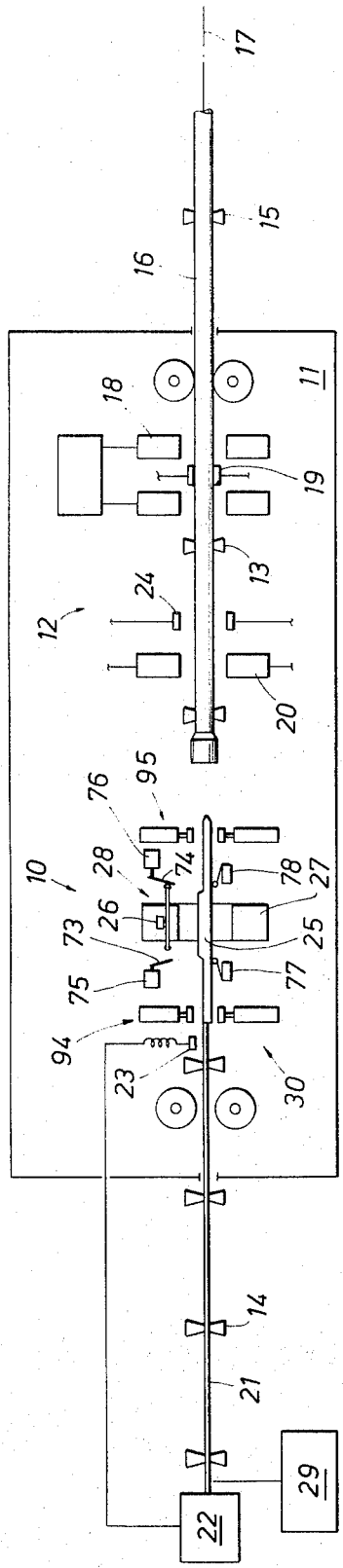

Turning now to FIG. 1, a schematic plan view is shown of thickness-measuring apparatus 10 arranged in accordance with the present invention and operatively mounted within a vehicle 11. To illustrate a typical situation in which the new and improved apparatus 10 can be advantageously used, the thickness-measuring apparatus is depicted as being axially aligned with other pipe-inspection apparatus 12 such as the flaw-inspection apparatus disclosed in the Tompkins U.S. Pat. No. RE 26,537. As is typical, the thickness-measuring apparatus 10 includes pipe-translating means, such as a selectively-powered conveyor 13 (which may be the conveyor shown in U.S. Pat. No. 3,565,310) mounted within the vehicle 11 and a pair of portable conveyors 14 and 15 (such as those disclosed in U.S. Pat. No. 3,250,404) arranged at the opposite ends of the vehicle, for selectively moving pipe sections, as at 16, back and forth through the vehicle along a generally-horizontal inspection axis 17.

Reference should be made, of course, to the aforementioned Tompkins patent for elaboration of the details of the flaw-inspection apparatus 12 and the particulars of its operation. However, the general arrangement of the flaw-inspection apparatus 12 and a typical inspection operation therewith should be understood to better appreciate its cooperation with the new and improved apparatus 10. In general, therefore, the flaw-inspection apparatus 12 is arranged to first progressively induce a longitudinally-oriented magnetic flux in a horizontal pipe, as at 16, being advanced axially in a first direction along the conveyor 13 so that transversely-oriented flaws in the pipe can be concurrently detected. Residual magnetism remaining in the pipe 16 is at least partially reduced by progressively subjecting the advancing pipe to a demagnetizing flux after it has been inspected for transversely-oriented flaws. When the pipe 16 is also to be inspected for longitudinally-oriented flaws, the pipe is moved onto the conveyor 14 and, after being halted, subjected to a circumferentially-oriented magnetic field. Thereafter, as the pipe 16 is returned in the opposite direction along the inspection axis 17, it is progressively inspected for longitudinally-oriented flaws. On the other hand, when this latter inspection is not performed, the pipe 16 is merely returned back through the vehicle 11 to the conveyor 15. In either situation, however, it is preferred that the new and improved thickness-measuring apparatus 10 be arranged for operation upon the return movement of the pipe 16 whether or not the latter flaw inspection is conducted.

To perform these inspections for transverse flaws, the inspection apparatus 12 preferably includes an annular coil 18 having spaced sections concentrically arranged around the inspection axis 17 with a plurality of flux-detecting heads 19 arranged therebetween. A second annular coil 20 is also concentrically arranged around the inspection axis 17 to the rear of the flux-inducing coil 18 and connected to a suitable AC or pulsating DC source (not shown) for progressively demagnetizing the pipe 16 as it leaves the flux-inducing coil.

The flaw-inspection apparatus 12 further includes an electrically-conductive, cantilevered elongated probe or lance 21 that is supported at its remote end and maintained in substantially-coincidental alignment along the inspection axis 17. When the pipe 16 is to be inspected for longitudinal flaws, it is advanced onto the lance 21 and halted when the lance has passed completely through the pipe and its free end projects out of the rearward end of the pipe. To subject the pipe 16 to a circumferentially-oriented magnetic field, a DC source 22 is connected between the remote supported end of the lance 21 and one or more laterally-movable electrical contacts 23 that are selectively engageable with the free end of the lance. Thereafter, as the pipe 16 is being returned, a plurality of flux-detecting heads 24 are selectively moved into contact with and coaxially rotated about the moving pipe for detecting generally-longitudinal flaws therein. As previously mentioned, it is preferred to operate the new and improved thickness-measuring apparatus 10 as the pipe 16 is withdrawn from over the lance 21 whether or not the pipe is to be inspected for longitudinal flaws.

In general, as depicted in FIG. 1, the preferred embodiment of thickness-measuring apparatus 10 incorporating the principles of the present invention is comprised of radiation-detecting means including a radiation detector 25 operatively positioned along the axis 17 and radiation means 26 mounted on a body 27 adapted for rotation about the inspection axis and cooperatively arranged with the new and improved radiation-controlling means 28 of the present invention for directing one or more inwardly-directed beams of radiation through the wall of the pipe 16 for interception by the radiation detector. As will subsequently be explained, the radiation-controlling means 28 are cooperatively arranged with new and improved circuitry 29 and detector-positioning means 30 of the present invention for successively checking the accuracy of the detector 25 before each inspection operation.

In a copending application filed simultaneously herewith by the present inventor Ser. No. 22,932 it is pointed out that the extreme narrowness of the single radiation pattern produced by the unit described in the aforementioned pending application Ser. No. 744,861, restricts the use of one of these units to the inspection of tubular members only within a limited range of diameters. Moreover, it has been found that this prior invention of the present inventor is best suited where tubular members being inspected are retained as nearly as possible in coincidental alignment with the inspection axis of the apparatus to assure maximum accuracy. In view of these two limiting factors of these prior units, therefore, the inspection of elongated tubular members which are slightly bent or the inspection of groups of such members of widely-varying diameters require special operating and handling techniques which correspondingly reduce the efficiency of the inspection operation. Accordingly, although the radiation-controlling means 28, the circuitry 29, and the detector-positioning means 30 are equally suited for these prior units, the new and improved apparatus and methods of the present invention will be described herein in conjunction with the new and improved radiation-emitting means 26 as disclosed and claimed in the aforementioned application filed simultaneously herewith.

As illustrated in FIG. 2, therefore, the radiation detector 25 is comprised of a typical radioactivity detector, such as an ionization chamber or a scintillation detector, which is mounted in a suitable enclosed protective housing 31 that is carried on the free end of the elongated probe 21. To adapt the detector 25 for movement relative to the lower internal wall of the pipe 16 as it is axially advanced or returned along the inspection axis 17, the protective housing 31 includes a central tubular portion 32 of nylon, or the like, that will not significantly attenuate incident radiation. In the embodiment illustrated in FIG. 2, a plurality of removable centralizing members, as at 33 and 34, are spaced circumferentially about the end portions of the detector housing 31 for retaining the detector 25 in general coincidental alignment with the inspection axis 17. As a matter of convenience, the centralizers 33 and 34 are adapted to be readily exchanged with other members (not shown) of greater or lesser heights so that the new and improved inspection apparatus 10 will be effective for inspecting a wide range of sizes of tubular members. As will be subsequently explained, by arranging the radiation means 26 to produce discrete beams of radiation that are each of a reduced transverse width somewhat less than that of the effective portion of the detector 25 and distributing these beams at predetermined intervals across the plane of rotation, the radiation detector will produce a uniform output signal even when it is eccentrically disposed in relation to the inspection axis 17.

Accordingly, in the preferred embodiment of the thickness-measuring apparatus 10 shown in FIG. 2, the radiation-detector 25 is mounted on the free end of the lance 21 and coaxially positioned within the rotating body 27 which includes a horizontal, generally-tubular member 35 having one end portion rotatably journalled within an enlarged, annular stationary housing 36 and adapted for high-speed rotation around the longitudinal inspection axis 17. The radiation means 26 are eccentrically located between two longitudinally-spaced annular plates or flanges 37 and 38 secured to the unsupported or other end portion of the rotatable member 35. To dynamically balance the rotating body 27, a target 39 of sufficient mass is mounted between the spaced flanges 37 and 38 diametrically opposite of the radiation means 26.

As best seen in FIG. 2, the rotating body 27 is concentrically arranged about the horizontal inspection axis 17 and journalled within the housing 36 by a pair of longitudinally-spaced bearings 40 and 41 carrying the supported end portion of the tubular member 35. In one manner of driving the rotating body 27 at high speeds about its rotational axis 17, the supported end of the tubular member 35 is extended beyond the outboard bearing 40 and coupled to driving means, such as a motor 42 mounted outside of the housing 36, by a suitable power transmission such as a typical chain or belt 43 operatively interconnecting a pulley 44 mounted on the tubular member and a pulley 45 mounted on the shaft of the motor.

Figure 3:
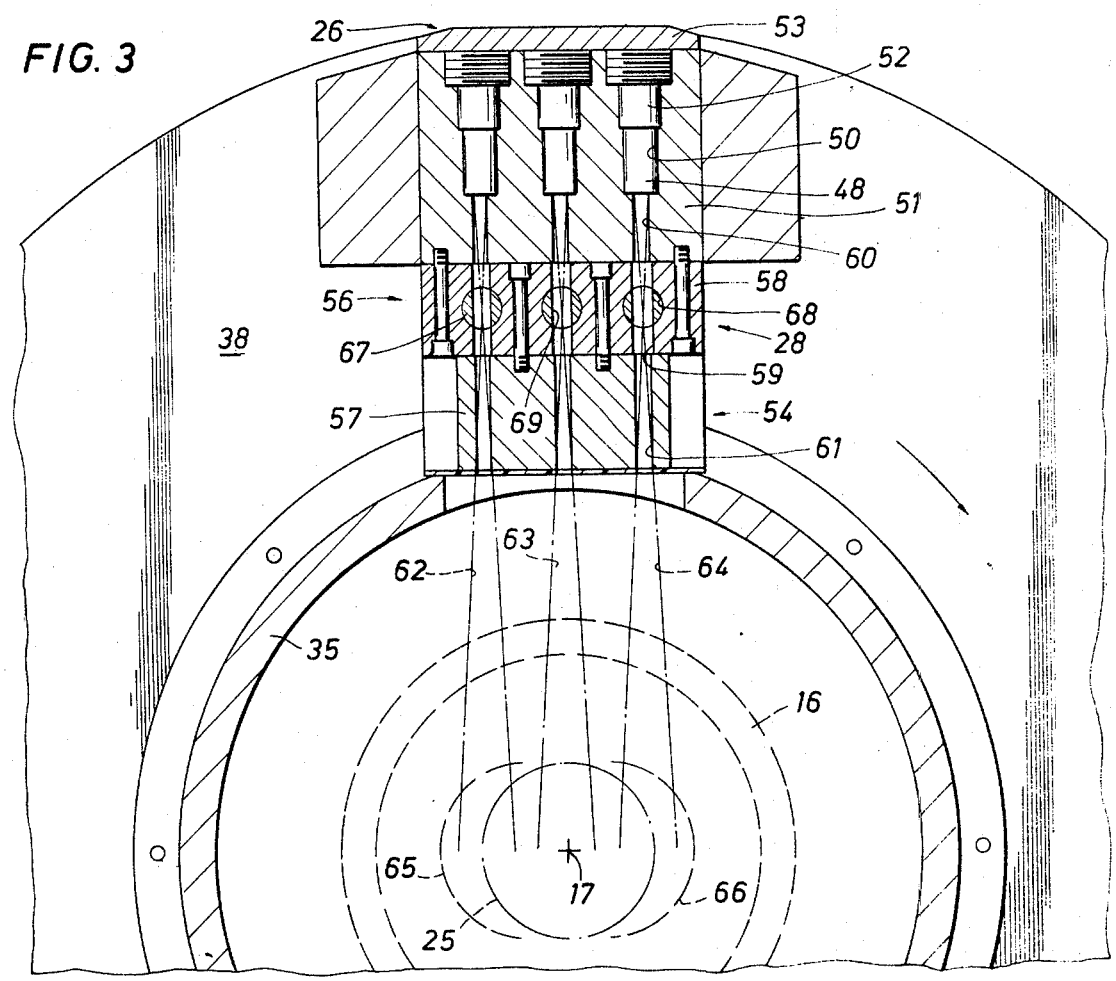
FIG. 3 is an enlarged cross-sectional view taken along the lines "3—3" in FIG. 2 and depicts a preferred embodiment of radiation-controlling means arranged in accordance with the principles of the present invention.

Turning now to FIG. 3, the radiation means 26 include an array of three isotropic radiation sources 46–48 (such as Cobalt 60, Cesium 137, or other acceptable sources of gamma radiation) which are respectively encased in typical source cups, as at 49, each having an opening in its lower end. The encapsulated radiation sources 46–48 are respectively disposed within one of three chambers, as at 50, formed side-by-side in the upper portion of a block 51 of a suitable radiation-attenuating or shielding material. To fully enclose the sources 46–48, a removable closure member, as at 52, is fitted into the open end of each of the source chambers 50 and a suitable cover plate 53 is secured to the shielding block 51 over each of the closure members.

The radiation means 26 further include particularly-arranged radiation-focusing means 54 adapted for cooperation with the radiation-controlling means 28 of the present invention which include selectively-operable shutter means 56 disposed between the focusing means and the radioactive sources 46–48. As best seen in FIG. 3, the focusing means 54 are comprised of a second block 57 formed of steel, tungsten, lead or some other suitable radiation-attenuating or shielding material that is mounted between the annular flanges 37 and 38 and spaced radially inwardly from the shielding block 51 and diametrically opposite from the target shield 39 (FIG. 2). The shutter means 56 are comprised of a third block 58 of radiation-shielding material mounted between the shielding block 51 and the focusing block 57 and having three generally-parallel radiation passages, as at 59, which are respectively aligned with three corresponding radiation passages, as at 60 and 61, respectively formed in the first and second blocks. As will subsequently be explained in greater detail and of paramount significance to the present invention, it will be seen that the shutter means 56 are uniquely arranged for selectively controlling the passage of radiation from the sources 46–48 to the detector 25.

It will be noted from FIG. 3 that the radioactive sources 46–48 are uniquely arranged so that separate, generally-parallel beams of radiation 62–64 are directed along a selected transverse plane intersecting the inspection axis 17. In particular, the radiation means 26 are arranged so that two of the three radiation beams 62 and 64 are respectively directed on opposite sides of the axis 17 and the third beam of radiation 63 will intersect the inspection axis. Accordingly, when the detector 25 is in position and coincidentally aligned with the inspection axis 17, the radiation beam 63 from the central radioactive source 47 will be directly impinged on the detector and the exterior or flanking beams of radiation 62 and 64 will substantially uniformly straddle the detector. On the other hand, as schematically depicted by the dashed circles 65 and 66, should the detector 25 be shifted laterally to either side of the inspection axis 17, the active portion of the detector will progressively receive more radiation from one or the other of the two flanking beams 62 (or 64) and correspondingly receive a lesser amount of radiation from the central beam 63.

Accordingly, as explained in greater detail in the copending application Ser. No. 22,932, by selecting a given energy or intensity for the central radioactive source 47, so long as the detector 25 remains coincidentally aligned with the inspection axis 17, the maximum intensity of the central radioactive source will be received thereby so as to produce the maximum output. On the other hand, lateral movement of the detector 25 to either one side or the other of the inspection axis 17 will progressively diminish the radiation intensity being received from the central source 47 by the detector and produce a correspondingly-reduced output signal. The same results will, of course, be obtained for each of the two flanking sources 46 and 48.

Accordingly, by selecting the sources 46 and 48 to have equal but lesser strengths than the central source 47 and cooperatively arranging the two flanking radioactive sources in the manner depicted in FIG. 3, as the detector 25 shifts to one side or the other of the inspection axis 17, the detector will be irradiated by a combination of one of the two flanking radiation beams, for example the left-hand beam 62, as well as the central radiation beam 63. Thus, as the detector 25 moves further to the left, the progressively-increasing signal produced by the weaker radioactive source 46 will be added to the progressively-diminishing signal produced by the central radioactive source 47 so as to produce a combined output that is substantially constant. The same response will, of course, be obtained whenever the detector 25 shifts to the right-hand side of the inspection axis 17 except that the right-hand radioactive source 48 will produce a progressively-greater output signal as the output signal contributed solely by the central radioactive source 47 progressively diminishes. It will, of course, be appreciated that the strengths of the two flanking sources 46 and 48 are cooperatively selected in accordance with their lateral spacing from the central source 47 to obtain the additional intensity to make the combined output substantially constant across the range of lateral movements of the detector 25.

It will be appreciated, therefore, that the radiation means 26 will produce a substantially-uniform output signal for a given thickness of metal between the radiation sources 46–48 and the detector 25 so as to at least minimize the effects which would otherwise be caused by even the slightest lateral shifting of the detector within the pipe 16. It should also be noted that even though the detector 25 may bounce upwardly and downwardly as the pipe 16 is being moved thereover, the radiation means 26 will also provide substantially-uniform signals over an acceptable range of vertical movement of the detector inasmuch as the radiation beams 62–64 are well collimated and the sides of each beam is relatively parallel so that the flux density of each beam will be substantially equal at different vertical positions within the range of vertical movement of the detector. Thus, the vertical movements of the detector 25 are usually within a range where the axes of the radiation beams 62–64 can be perfectly parallel and still maintain a substantially-equal flux density within this range. It has been found, however, that by arranging the outer radiation passages 59 and 61 to converge the flanking beams 62 and 64 slightly inwardly a few degrees, the outer radiation patterns will be moved slightly inwardly toward the central radiation pattern to produce a more-uniform flux density over a greater range of vertical movements of the detector 25 without reducing its range of lateral movements.

Accordingly, the radiation-controlling means 28 of the present invention are operatively arranged for selectively attenuating the radiation beams 62–64 at all times that a pipe, as at 16, is not positioned over the detector 25. Thus, by reducing the intensity of radiation intercepted by the detector 25 to at least a reduced level that will not create the aforementioned unstability or drifting of the detector, the new and improved thickness-measuring apparatus 10 can be operated at efficient inspection rates without compromising the accuracy of the resulting measurements.

Referring again to FIGS. 2 and 3, it will be noted that the shutter means 56 include three elongated rods, as at 67, that are respectively arranged for sliding movement within complementary passages 68 formed in the block 58 and respectively intersecting the radiation passages 59 therein. In the preferred embodiment of the shutter means 56, these intersecting passages 68 are parallel to the inspection axis 17 and the elongated rods 67 are of sufficient length that they will project outwardly from the forward and rearward faces of the flanges 37 and 38.

As best seen in FIGS. 2 and 3, each of these bars 67 are provided with a first portion having a transverse port, as at 69, formed therein of a similar or identical cross section as the radiation passages 59 and through which radiation may readily pass when these transverse openings are in registration with the radiation passages 59. Of significance to the present invention, it will be noted that a second portion, as at 70, of each of the bars 67 is formed to have a thickness of a selected and predetermined magnitude so that upon movement of the bars to position these reduced portions in alignment with the radiation passages 59, the radiation intercepted by the radiation detector 25 will be reduced to produce a selected count rate at the detector.

In the preferred embodiment of the new and improved radiation-controlling means 28 of the present invention, the shutter means 56 are further arranged for selectively moving the shutter rods 67 to bring their respective openings 69 into registration with the radiation passages 59 just as the leading end of the pipe 16 approaches the detector 25 and then repositioning the rods to bring their respective obturating portion 70 back into the radiation passages 59 as the trailing end of the moving pipe passes over the detector. It will be appreciated, therefore, that these alternately-directed movements of the shutter bars 67 between their respective positions will assure that the detector 25 will be protected from exposure to excessive radiation intensities that could otherwise create the aforementioned problems with unstability or drifting of the detector.

In the preferred manner of accomplishing these alternately-directed movements of the shutter bars 67 and as disclosed and claimed in a copending application Ser. No. 22,933 filed simultaneously herewith, rounded knobs, as at 71 and 72, are mounted on the outer ends of each of the rods. Since the rods 67 will follow approximately the same circular path upon rotation of the rotating body 27, straps, as at 73 and 74 (FIG. 1), of a relatively-flexible material are respectively secured to the forward and rearward portions of the housing 36 and operatively arranged for pivotal movement from first positions away from the housing to second positions immediately adjacent thereto which respectively intercept the paths of rotation of the forward and rearward knobs 71 and 72. Selectively-operated solenoid actuators 75 and 76 are arranged adjacent to the straps 73 and 74, respectively, and so located that, upon energization of the first actuator 75, the strap 73 will be moved into the rotational path of the knobs 71 and will accordingly shift the shutter rods 67 to the position illustrated in FIG. 2 before the rotating body 27 completes a full revolution. Conversely, by energizing the second actuator 76, the shutter rods 67 will be quickly shifted in the reverse direction to their alternate position for opening the radiation passages 59. In the preferred embodiment of the thickness-measuring apparatus 10, the selective operation of the solenoid actuators 75 and 76 is accomplished by arranging typical limit switches, as at 77 and 78 in FIG. 1, for contact by the pipe 16 as it passes along the conveyor 13 to shift the shutter rods 67 back and forth in proper coordination with the operation of the thickness-measuring apparatus.

Turning now to FIG. 4, the new and improved circuitry 29 of the present invention is depicted. In general, as will be subsequently described by reference to FIGS. 5A–5D, the circuitry 29 is uniquely arranged so that each time the shutter rods 67 are in their radiation-blocking positions, a calibration measurement is made of the thickness of the obturating portions 70 of the rods. Then, as a pipe, as at 16, is being inspected, the resulting thickness measurements being obtained are compared with the previously-obtained calibration measurement for determining the accuracy of these thickness measurements.

To convert the output signal of the radiation detector 25 to a meaningful record, the output of the detector is coupled by way of suitable conductors 79 and 80 and an amplifier 81 to an indicator, such as a recorder 82, that is appropriately arranged for progressively providing a continuous first indication representative of the wall thickness of a tubular member passing through the inspection apparatus 10. As an additional feature, the circuitry 29 also includes a time-averaging circuit 83 appropriately tuned to average the output of the detector 25 for each revolution of the sources 46–48 to provide a second indication, as on a typical recorder 84, representative of the transverse cross-sectional metal area through that portion of the tubular member scanned in that revolution. In this manner, by driving the recorders 82 and 84 at speeds related to the axial speed of the pipe 16 past the apparatus 10, continuous meaningful records will be obtained of the actual metal thicknesses along the generally-helical inspection path around the pipe as well as of successive transverse cross-sectional metal areas along the length of the pipe. The circuitry 29 further includes alarm indicators, as at 85 and 86, coupled to the recorders 82 and 84 and adapted for warning the operator of the apparatus 10 that the respective thickness and area measurements are less than some selected minimum value.

To provide the aforementioned calibration measurements, the circuitry 29 further includes a normally-open relay 87 which is appropriately connected to the solenoid actuator 76 and adapted to be closed when the shutter rods 67 are in their radiation-blocking positions. In this manner, when the radiation passages 59 are closed, the output of the detector 25 will be temporarily coupled by way of an adder 88, a follower 89, and an inverting adder 90 to the amplifier 81 to produce an input signal at the recorder 82 that corresponds to the known thickness of the obturating portions 70 of the shutter bars 67. A selectively-adjustable reference signal, such as provided by a constant-voltage source 91 and a potentiometer 92, is coupled to the other input of the adder 88 for accurately resetting the recorder 82 before the first pipe that is to be inspected is passed through the thickness-measuring apparatus 10. Once this reference signal is correctly set, the potentiometer 92 is not changed until such time that the thickness-measuring apparatus 10 is again recalibrated.

For reasons that will subsequently be explained, the adder 88 is a signal-inverting adder so that the combination of the detector output signal and the reference signal will be inverted by the adder to provide a calibration signal. The calibrated output signal from the inverting adder 88 is stored by a capacitor 93, and by employing the high-impedance follower 89, will remain as a fixed input to the adder 90 after the relay 87 is opened. It will be appreciated, therefore, that when the relay 87 is closed and the reference signal is applied to the first inverting adder, the inversion of the signals by the adder 88 will produce an output signal from the second adder 90 that equals only the reference signal. On the other hand, the signal initially stored by the capacitor 93 will be the inverted summation of the reference signal and the output signal of the detector 25 at the time the radiation passages 59 are blocked.

Figure 5A:
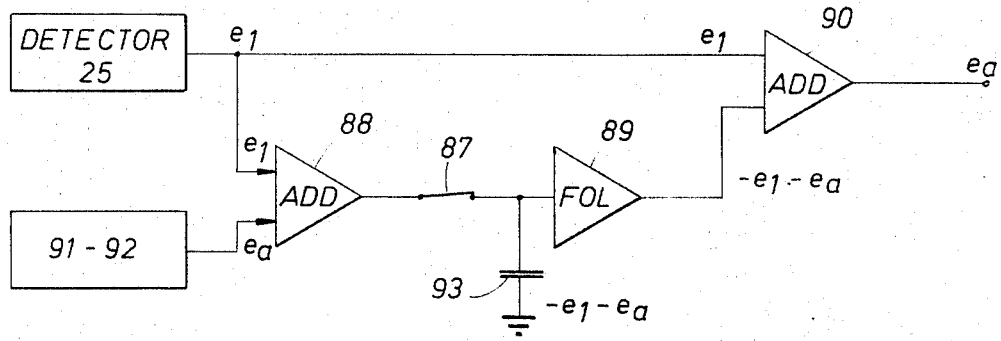
Figure 5B:
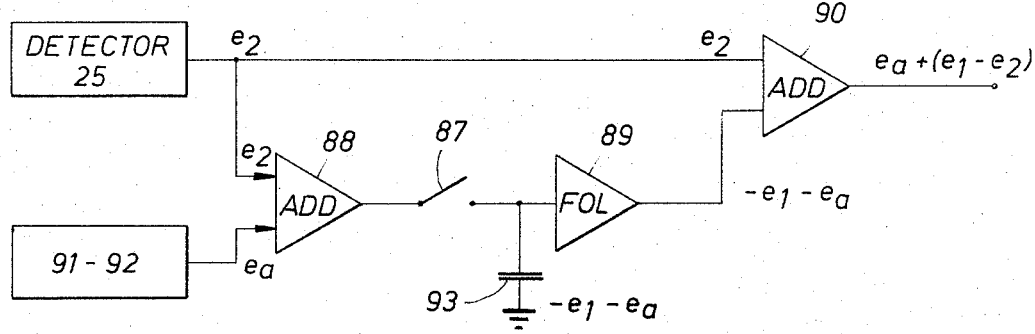

Accordingly, as best seen in FIG. 5A, once the reference signal ($e_a$) has been properly set to obtain the correct reading at the recorder 82 corresponding to the thickness of the obturating portions 70, the potentiometer 92 is left alone. Those skilled in the art will, of course, appreciate that since the scattering of the radiation beams 62–64 will be dependent upon the diameter of the tubular member being inspected, an empirically-determined compensation factor must be included with the reference signal ($e_a$) which will be established by the setting of the potentiometer 92. Thus, for each diameter of pipe, a different empirical factor will be determined for arriving at the magnitude of the reference signal, $e_a$. Then, as the first pipe, as at 16, is being moved into the inspection apparatus 10, the relay 87 will open and leave the capacitor 93 charged with the summed signal, $-e_1 = e_a$. As shown in FIG. 5B, as the thickness measurements are being obtained, it will be appreciated that the output signal $(e_a + e_1 - e_2)$ of the adder 90 will be equal to the algebraic summation of the reference signal $(e_a)$ and the difference in the output signal of the detector 25 at that moment $(e_2)$ and the detector output signal $(e_1)$ at the time the recorder 82 was calibrated. Thus, the signal $(e_a + e_1 - e_2)$ that is recorded by the recorder 82 will, in effect, be the differences between the varying wall thicknesses of the pipe 16 and the known thicknesses of the obturating portions 70 of the shutter bars 67. These readings can, of course, be presented on the recorder 82 either as a true thickness measurement or as the difference between this known thickness and the thickness then being measured.

Figure 5C:
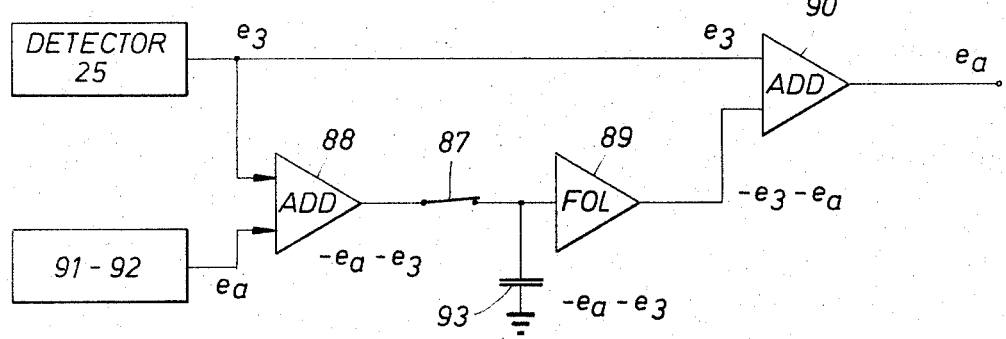

Once the first pipe has been inspected, the shutter bars 67 will, of course, be reclosed and, as shown in FIG. 5C, the relay will still be closed when the next pipe is ready for inspection. AT this time, if there has been drifting of the detector 25, the calibration signal $(-e_a - e_3)$ that is then stored on the capacitor 93 will be the inverted algebraic summation of the unchanged reference signal $(e_a)$ and the output signal $(e_3)$ of the detector which will be then produced as a result of any drifting. It will be recalled that the potentiometer 92 is not changed. Thus, with the relay 87 being reclosed, the output of the adder 90 will again be momentarily equal to only the original unchanged reference signal $(e_a)$ which will indicate that the circuitry 29 is still properly calibrated.

Figure 5D:
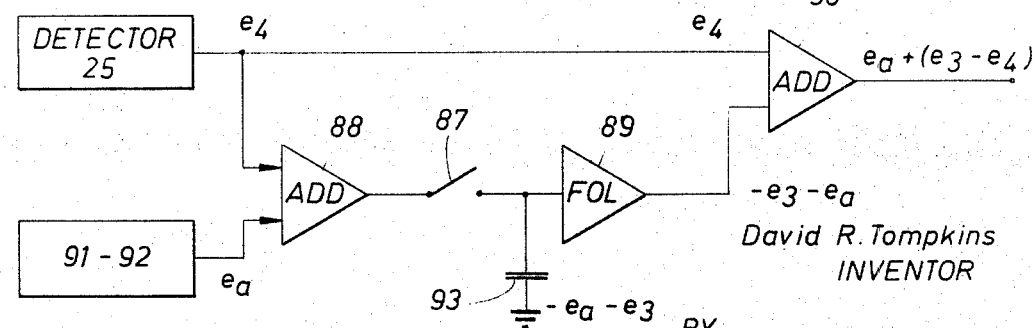

Once the next pipe is moved through the thickness-measuring apparatus 10 and the relay 87 is reopened as shown in FIG. 5D, the resulting output signal $(e_a + e_3 - e_4)$ from the adder 90 will again be equal to the algebraic summation of the reference signal $(e_a)$ and the difference in the output signal of the detector at that moment $(e_4)$ and the detector output signal $(e_3)$ at the time the second calibrating signal $(-e_a - e_3)$ was stored on the capacitor 93. Hereagain, the resulting signal $(e_a + e_3 - e_4)$ recorded by the recorder 82 will be representative of the differences in the thicknesses of the pipe being inspected and the known thickness of the obturating portions 70 of the shutter bars 67. It will be appreciated, therefore, that any drifting of the detector 25 between successive inspection operations will be completely compensated since a new calibration signal is stored on the capacitor 93 just before each inspection operation. Drifting errors during the actual inspection operation will, of course, be only negligible at worse.

It will be appreciated that a more-precise calibration signal can be stored in the capacitor 93 if the detector 25 is in a known position in relation to the radiation sources 46–48. Accordingly, the detector-positioning means 30 of the present invention are provided for temporarily fixing the detector 25 in a selected position as the calibration measurements are being obtained.

Accordingly, in the preferred manner of accomplishing this, first and second selectively-operable clamping devices 94 and 95 (FIGS. 1 and 2) are arranged at opposite ends of the tubular member 35 and cooperatively arranged to secure the detector 25 in coincidental alignment with the inspection axis 17 as a calibration measurement is being obtained. In general, each of the clamping devices 94 and 95 is comprised of an opposed pair of clamps, as at 96 and 97 (FIG. 6), which are respectively disposed above and below the conveyor 13 and operatively carried for vertical movement on suitable guides or uprights 98 and 99 stationed on opposite sides of the conveyor. Suitable devices, such as solenoid-actuators or hydraulic piston actuators as at 100 and 101, are operatively coupled to the clamps 96 and 97, respectively, and suitably arranged for moving the opposed clamps in unison into clamping engagement on the respective end portions of the detector housing 31 for coaxially positioning the detector 25 therein when a calibration measurement is to be made. Once the calibration measurement is completed, the actuators 100 and 101 are reversed to return the clamps 96 and 97 to their normal positions so that the pipe 16 can freely pass through the clamping devices 94 and 95.

To employ the thickness-measuring apparatus 10 for practicing the new and improved methods of the present invention, a pipe, as at 16, is placed on the conveyor 15 and advanced (to the left as viewed in FIG. 1) along the conveyor 13 and over the elongated lance 21 at the opposite end of the vehicle 11. It will, of course, be appreciated that if the flaw-inspection apparatus 12 is being operated, the first inspection to be made with this apparatus will be performed as the pipe 16 passes along the conveyor 13.

In any event, once the pipe 16 is on the conveyor 14 and has passed the detector 25, the pipe is momentarily halted and the clamping devices 94 and 95 are actuated. At this point, the shutter bars 67 will be in their radiation-blocking positions to reduce the intensity of the radiation intercepted by the detector 25. Thus, since the obturating portions 70 of the shutter bars 67 will always provide a constant output signal which, since the relay 87 (FIG. 4) is then closed, will be stored in the capacitor 93.

Once this reference signal is obtained, the clamping devices 94 and 95 are operated to move their respective clamps 96 and 97 out of the path of the pipe 16 and the pipe is returned back along the conveyor 13 through the rotating body 27. As previously described, as the leading end of the pipe 16 nears the thickness-measuring apparatus 10, the actuator 75 will be operated for shifting the shutter bars 67 to bring their ports 69 into alignment with the radiation passages 59 before the rotating body 27 completes a full revolution.

As the pipe 16 passes through the rotating body 27, one wall of the pipe will be interposed between the radiation means 26 and the detector 25 to produce a varying signal representative of the thickness of each incremental portion of the pipe wall being progressively scanned by the radiation beams 62–64. This varying signal will be combined by the adder 90 with the previously-obtained calibration signal that is stored in the capacitor 93 to provide an output signal from the amplifier 81 that is representative of the differences between the known thickness of the obturating portions 70 of the shutter bars 67 and the wall thicknesses of the pipe 16. Once the trailing end of the pipe 16 clears the detector 25, the actuator 76 is operated to reposition the obturating portions 70 of the shutter bars 67 into alignment with the radiation passages 59 for again reducing the intensity of radiation to an acceptable level. The thickness-measuring apparatus 10 is then in readiness for accepting another pipe once the pipe 16 is removed from the conveyor 15.

It will be appreciated, therefore, that the present invention has provided new and improved radiation apparatus and methods for accurately and quickly measuring the wall thickness of elongated tubular members. By arranging the new and improved radiation-controlling means for selectively blocking one or more narrowly-focused beams of radiation which are directed toward the radiation detector, a calibration signal will be obtained. Then, as a tubular member is advanced along the inspection axis and over the detector, the radiation-controlling means will function for successively obtaining thickness measurements of the tubular member passing along the axis. By successively comparing these signals with the calibrating signals respectively obtained before each inspection operation, drifting of the detector will be effectively compensated and more accurate measurements obtained. Moreover, by selectively positioning the detector as each calibration signal is obtained, it will be assured that the detector is correctly calibrated.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for measuring the thickness of different wall portions of an elongated tubular member comprising the steps of: positioning a standard member of a known thickness in a beam of radiation produced by radiation-emitting means and directed toward radiation-detecting means for obtaining a calibrating signal representative of the attenuation of said beam of radiation by said standard member; storing said calibrating signal; inserting one of said radiation means into an elongated tubular member for interposing the wall of said tubular member between said one radiation means and the other of said radiation means; moving said tubular member in relation to said radiation means for obtaining successive signals respectively representative of the attenuation of said beam of radiation produced by different wall portions of said tubular member interposed between said radiation means; and combining said stored calibrating signal with said successive signals for producing a plurality of signals respectively representative of the differences between said known thickness and the respective thicknesses of said different wall portions.

2. The method of claim 1 wherein said one radiation means is said radiation-detecting means.

3. The method of claim 1 wherein said tubular member is moved axially so that said different wall portions thereof are at longitudinally-spaced positions along the length of said tubular member.

4. The method of claim 3 wherein said one radiation means is said radiation-detecting means and said radiation-detecting means include a radiation detector adapted to be inserted into said tubular member for intercepting said beam of radiation upon rotation of said radiation-emitting means about said tubular member; and further including the step of rotating said radiation-emitting means about said tubular member as said tubular member is moved axially so that said successive signals are respectively representative of the attenuation by different wall portions of said tubular member disposed along a generally-helical path therealong.

5. Apparatus adapted for measuring the thickness of a test member comprising: radiation-emitting means adapted for directing a beam of radiation along a selected axis; radiation-detecting means including a radiation detector positioned on said axis for receiving said beam of radiation and adapted for producing signals representative of the intensity of radiation received by said radiation detector; controlling means including a member having a radiation-attenuating portion of known thickness adapted for movement into and out of said beam of radiation between said radiation-emitting means and said radiation detector; and signal-comparing means operatively coupled to said radiation detector and adapted for comparing first signals produced thereby when only said radiation-attenuating portion is intersected by said beam of radiation with second signals produced by said detector when only a test member of an unknown thickness is intersected by said beam of radiation, said signal-comparing means including means coupled to said radiation detector and adapted for storing said first signals as said first signals are being produced, and means coupled to said radiation detector and to said signal-storing means and adapted for combining said first signals with said second signals as said second signals are being produced to produce third signals representative of the difference between said known thickness and the thickness of a test member subsequently interposed between said radiation detector and said radiation-emitting means.

6. The apparatus of claim 5 further including: clamping means selectively operable for releasably securing said radiation detector in a known position in relation to said radiation-emitting means when said first signals are being produced.

7. The apparatus of claim 5 further including: means adapted for moving a test member relative to said radiation detector and said radiation-emitting means for obtaining a series of said second signals respectively representative of the radiation attenuation produced by successive portions of such a test member for comparison with said first signals.

8. The apparatus of claim 7 wherein said moving means are adapted for moving a test member into and out of positions between said radiation detector and said radiation-emitting means to obtain said second signals.

9. The apparatus of claim 7 wherein said moving means are adapted for moving one of said radiation means in relation to the other of said radiation means and a test member interposed therebetween to obtain said second signals.

10. The apparatus of claim 9 wherein said one radiation means is said radiation-emitting means.

11. Apparatus adapted for measuring the wall thickness of an elongated tubular member comprising: radiation-detecting means including a radiation detector adapted for insertion into a tubular member to receive radiation directed laterally therethrough; radiation-emitting means spaced from said radiation detector and operatively arranged for directing a beam of radiation theretoward; radiation-controlling means including a movable member having a first portion of a known thickness adapted for interposition between said radiation-emitting means and said radiation detector to attenuate said beam of radiation to a selected intensity and a second portion having a radiation passage therein adapted for passing said beam of radiation, and means adapted for selectively shifting said movable member between first and second positions to respectively position said first and second portions in said beam of radiation; first signal means coupled to said radiation detector and operable when only said first portion of said movable member is positioned in said beam of radiation for producing a first signal representative of said known thickness and storing said first signal as said first signal is being produced; second signal means coupled to said radiation detector and operable only when said radiation passage is positioned in said beam of radiation and said radiation detector is inserted into a tubular member for producing a second signal representative of the wall thickness thereof; signal-comparing means operatively coupled to said first and second signal means and adapted for combining said stored first signal and said second signal as said second signal is being produced to produce a third signal representative of the difference between said known thickness and the wall thickness of a tubular member disposed over said radiation detector; and means operable only upon insertion of said radiation detector into a tubular member for shifting said movable member from its said first position to its said second position.

12. The apparatus of claim 11 further including: means adapted for axially moving a tubular member back and forth in relation to said radiation detector to obtain a series of said second signals respectively representative of the wall thicknesses of successive portions of such a tubular member so that said signal-comparing means will combine said first and second signals to produce said third signals for measuring the differences between said known thickness and the wall thicknesses of successive portions of a tubular member moving over said radiation detector.

13. The apparatus of claim 12 wherein said radiation detector is responsive to radiation imposed thereon from any lateral direction thereabout and further including: means coupled to said radiation-emitting means and operatively arranged and adapted for rotating said radiation-emitting means about said radiation detector for directing a lateral beam of radiation theretoward whenever a tubular member is disposed over said radiation detector so that said third signals will be respectively representative of the differences between said known thickness and the wall thickness of successive helically-distributed portions of a tubular member moving over said radiation detector.

14. The apparatus of claim 13 further including: clamping means selectively operable for releasably securing said radiation detector in a known position in relation to said radiation-emitting means when said first signals are being produced.

* * * * *